US012735990B2

(12) United States Patent
Vignola et al.

(10) Patent No.: US 12,735,990 B2
(45) Date of Patent: Sep. 15, 2026

(54) GAS TURBINE ENGINE ROTOR STAGE WITH SEAL MEMBERS

(71) Applicant: Pratt & Whitney Canada Corp., Longueuil (CA)

(72) Inventors: Sylvain Vignola, St-Basile Grand (CA); Gabrielle Lamarche, Saint-Roch de Richelieu (CA)

(73) Assignee: Pratt & Whitney Canada Corp., Longueuil (CA)

(*) Notice: Subject to any disclaimer, the term of this patent is extended or adjusted under 35 U.S.C. 154(b) by 0 days.

(21) Appl. No.: 19/005,597

(22) Filed: Dec. 30, 2024

(65) Prior Publication Data

US 2026/0185455 A1 Jul. 2, 2026

(51) Int. Cl.
*F01D 11/00* (2006.01)
*F01D 5/30* (2006.01)

(52) U.S. Cl.
CPC .......... *F01D 11/006* (2013.01); *F01D 5/3007* (2013.01); *F05D 2220/32* (2013.01); *F05D 2240/24* (2013.01); *F05D 2240/30* (2013.01); *F05D 2240/55* (2013.01)

(58) Field of Classification Search
CPC . F01D 5/22; F01D 5/26; F01D 11/006; F01D 5/3007; F05D 2240/24; F05D 2240/30; F05D 2240/55
See application file for complete search history.

(56) References Cited

U.S. PATENT DOCUMENTS

| | | | | |
|---|---|---|---|---|
| 3,918,842 A | | 11/1975 | Longley | |
| 4,029,436 A | * | 6/1977 | Shoup, Jr. | F01D 11/006 416/193 A |
| 4,183,720 A | * | 1/1980 | Brantley | F01D 11/008 416/193 A |
| 4,464,096 A | * | 8/1984 | Trousdell | F01D 11/006 416/221 |
| 4,473,337 A | * | 9/1984 | Leonardi | F01D 11/006 416/193 A |

(Continued)

FOREIGN PATENT DOCUMENTS

| | | |
|---|---|---|
| GB | 2400144 B | 3/2005 |
| JP | H09303107 A | 11/1997 |
| JP | 7305602 B2 | 7/2023 |

OTHER PUBLICATIONS

EP Search Report for EP Patent Application No. 25227734.8 dated Jun. 8, 2026.

*Primary Examiner* — Aaron R Eastman
(74) *Attorney, Agent, or Firm* — Getz Balich LLC

(57) ABSTRACT

A rotor stage for a gas turbine engine is provided that includes first and second rotor blades, a disk, and a seal member. Each rotor blade has an airfoil, an attachment section, a neck section, and a platform. The platform extends laterally outward from the neck section. The platform has platform inner and outer radial surfaces. The disk has forward and aft axial end surfaces and disk slots. A first rotor blade includes a first rib extending outwardly from a platform inner radial surface. In an assembled state, the blade attachment sections are received in the disk slots. In the assembled state, the rotor blade platforms and an outer radial surface of the disk form a tab slot. In the assembled state, the first rib locates the seal member relative to the platform lateral edge surfaces.

19 Claims, 18 Drawing Sheets

(56) References Cited

U.S. PATENT DOCUMENTS 4,875,830 A * 10/1989 Trousdell .............. F01D 11/008 416/193 A
4,936,749 A * 6/1990 Arrao .................... F01D 11/008 416/193 A
5,478,207 A * 12/1995 Stec .......................... F01D 5/22 416/500
5,573,375 A * 11/1996 Barcza .................. F01D 11/006 416/193 A
5,746,578 A * 5/1998 Brassfield ................. F01D 5/22 416/193 A
5,785,499 A * 7/1998 Houston ................... F01D 5/22 416/500
5,823,741 A * 10/1998 Predmore ............. F01D 11/005 415/134
5,827,047 A * 10/1998 Gonsor ................. F01D 11/008 416/193 A
6,267,557 B1 * 7/2001 Chin ......................... F01D 5/22 416/223 R
6,315,298 B1 * 11/2001 Kildea .................. F01D 11/008 277/433
6,354,803 B1 3/2002 Grover
6,851,932 B2 2/2005 Lagrange
9,410,433 B2 8/2016 Alquier
9,822,644 B2 * 11/2017 Tardif ................... F01D 5/3007
10,113,434 B2 * 10/2018 Snyder ...................... F01D 5/22
10,731,479 B2 * 8/2020 Thistle ...................... F01D 5/22
10,767,504 B2 9/2020 Martin, Jr.
11,066,938 B2 * 7/2021 Umehara .................. F01D 5/22
2002/0090296 A1 * 7/2002 Kuwabara ............. F01D 11/008 415/169.1
2007/0269315 A1 * 11/2007 Funk ..................... F01D 11/006 416/219 R
2010/0034657 A1 * 2/2010 Hunt ......................... F01D 5/22 416/190
2010/0040479 A1 * 2/2010 Spangler ............... F01D 11/006 416/193 A
2010/0061854 A1 * 3/2010 Townes ..................... F01D 5/22 416/223 R
2010/0129226 A1 * 5/2010 Strohl ....................... F01D 5/22 277/312
2010/0158686 A1 * 6/2010 Kim ...................... F01D 5/3007 416/500
2012/0121423 A1 * 5/2012 Honkomp ............ F01D 11/006 416/190
2012/0171040 A1 * 7/2012 Walunj ...................... F01D 5/22 416/220 R
2012/0237352 A1 * 9/2012 Boyer ....................... F01D 5/26 416/221
2013/0195665 A1 * 8/2013 Snyder ...................... F01D 5/22 416/174
2014/0030100 A1 * 1/2014 Joshi ..................... F01D 11/006 29/402.02
2014/0119917 A1 * 5/2014 Tarczy .................. F01D 5/3069 416/140
2016/0032751 A1 * 2/2016 Snyder ................. F16J 15/0887 416/223 A
2016/0215640 A1 * 7/2016 Bergman .............. F01D 11/005
2016/0222800 A1 * 8/2016 Kleinow ............... F01D 5/3084
2016/0273367 A1 9/2016 Lana
2016/0281521 A1 * 9/2016 Clum ....................... F16J 15/02
2016/0326898 A1 11/2016 Mongillo, Jr.
2016/0348525 A1 * 12/2016 Thornton ................ F01D 5/147
2018/0149025 A1 * 5/2018 Thistle .................. F01D 11/008
2018/0187558 A1 * 7/2018 Thistle .................. F04D 29/322
2018/0187559 A1 7/2018 Thistle
2018/0187562 A1 * 7/2018 Thistle ...................... F01D 5/26
2018/0283193 A1 * 10/2018 Walker .................. F01D 11/008
2019/0010810 A1 1/2019 Snyder
2019/0093493 A1 * 3/2019 Soda ..................... F01D 11/006
2020/0248566 A1 * 8/2020 Bitzko .................. F01D 11/006
2021/0054745 A1 * 2/2021 Vetters .................... F01D 5/147
2021/0301669 A1 * 9/2021 Jasper ....................... F02C 3/04
2021/0332761 A1 * 10/2021 LoRicco ................... F02C 7/12
2022/0018256 A1 * 1/2022 Vachon ................. F01D 5/3007
2024/0117748 A1 * 4/2024 Tardif ................... F01D 11/006

* cited by examiner

GAS TURBINE ENGINE ROTOR STAGE WITH SEAL MEMBERS

BACKGROUND OF THE INVENTION

1. Technical Field

The present disclosure relates to gas turbine engines in general, and to rotor stages with rotor blade platform seal members in particular.

2. Background Information

Gas turbine engines, such as those that power modern commercial and military aircraft, generally include a compressor to pressurize an airflow, a combustor to combust a fuel, and a turbine to extract energy from the resultant combustion gases. The turbine section 26 typically includes a plurality of rotor stages and stator vane stages. Each rotor stage includes a plurality of rotor blades attached to a disk. The rotor blades are circumferentially distributed and extend radially out from the disk. Each rotor blade includes an attachment section (sometimes referred to as the "root"), a neck section, a platform, and an airfoil. The attachment section of each rotor blade is configured for mating engagement with a slot disposed within the disk. The neck section extends between the attachment section and the airfoil. The airfoil includes a suction side, a pressure side, a leading edge, and a trailing edge. The platform extends laterally outward from the neck section on the suction and pressure sides, and outwardly from the axially forward end of the neck section and outwardly from the axially aft end of the neck section. An outer radial surface of the platform is contiguous with the airfoil.

When the rotor blades are all mounted within the disk, a gap is disposed between the platforms of adjacent rotor blades. A seal member (sometimes referred to as a "feather seal") is disposed at the gap to prevent or impede air flow through the gap. The seal members often have a configuration that makes it difficult to assemble the rotor stage. In some existing designs, once the seal member is in place it cannot readily be seen by the technician assembling the rotor stage. It would be beneficial to have a seal member that provides desirable seal and one that facilitates assembly.

SUMMARY

According to an aspect of the present disclosure, a rotor stage for a gas turbine engine is provided that includes a first rotor blade, a second rotor blade, a disk, and a seal member. The first rotor blade (FRB) has an FRB airfoil, an FRB attachment section, an FRB neck section, and an FRB platform. The FRB neck section extends between the FRB attachment section and the FRB airfoil. The FRB platform extends laterally outward from the FRB neck section. The FRB platform has FRB platform inner and outer radial surfaces and an FRB platform lateral edge surface that extends between the FRB platform inner and outer radial surfaces. The second rotor blade (SRB) has an SRB airfoil, an SRB attachment section, an SRB neck section, and an SRB platform. The SRB neck section extends between the SRB attachment section and the SRB airfoil. The SRB platform extends laterally outward from the SRB neck section. The SRB platform has SRB platform inner and outer radial surfaces and an SRB platform lateral edge surface that extends between the SRB platform inner and outer radial surfaces. The disk is configured for rotation about a rotational axis. The disk has forward and aft axial end surfaces, an outer radial surface that extends between the forward and aft axial end surfaces, a first disk slot configured to receive the FRB attachment section, and a second disk slot configured to receive the SRB attachment section. The first and second disk slots are circumferentially adjacent one another. The first rotor blade includes at least one first rib extending outwardly from the FRB platform inner radial surface. The first rib includes a first rib end surface. The rotor stage is configurable in an assembled state. In the assembled state, the FRB attachment section is fully received in the first disk slot, and the SRB attachment section is fully received in the second disk slot. In the assembled state, the FRB platform, the SRB platform, and the outer radial surface of the disk form at least one tab slot. The seal member includes a central segment and an axial locator tab. In the assembled state, the central segment is engaged with the at least one first rib and the at least one first rib locates the seal member relative to the FRB platform lateral edge surface and the SRB platform lateral edge surface.

In any of the aspects or embodiments described above and herein, the at least one first rib may include a plurality of first ribs, and in the assembled state, the first ribs may be disposed to engage with the central segment of the seal member.

In any of the aspects or embodiments described above and herein, each first rib may include a first end surface configured for engagement with the seal member. The first end surface of each first rib may be spaced apart from the FRB platform lateral edge surface.

In any of the aspects or embodiments described above and herein, the first end surface of each first rib may converge from a distal peak surface toward the FRB platform lateral edge surface.

In any of the aspects or embodiments described above and herein, at least one first rib may extend outwardly from the FRB platform inner radial surface on a pressure side portion of the FRB platform, and at least one first rib may extend outwardly from the FRB platform inner radial surface on a suction side portion of the FRB platform.

In any of the aspects or embodiments described above and herein, the second rotor blade may include at least one second rib extending outwardly from the SRB platform inner radial surface, and the second rib includes a second rib end surface.

In any of the aspects or embodiments described above and herein, the at least one first rib includes a plurality of first ribs, and in the assembled state, the plurality of first ribs may be disposed to engage with the central segment of the seal member, and the at least one second rib may include a plurality of second ribs, and in the assembled state, the plurality of second ribs may be disposed to engage with the central segment of the seal member.

In any of the aspects or embodiments described above and herein, at least one first rib may extend outwardly from the FRB platform inner radial surface on a pressure side portion of the FRB platform, and at least one first rib may extend outwardly from the FRB platform inner radial surface on a suction side portion of the FRB platform, and at least one second rib may extend outwardly from the SRB platform inner radial surface on a pressure side portion of the SRB platform, and at least one second rib may extend outwardly from the SRB platform inner radial surface on a suction side portion of the SRB platform.

In any of the aspects or embodiments described above and herein, each first rib may include a first end surface configured for engagement with the seal member, and each second rib may include a second end surface configured for engagement with the seal member.

In any of the aspects or embodiments described above and herein, the first end surface of each first rib may be spaced apart from the FRB platform lateral edge surface, and the second end surface of each second rib may be spaced apart from the SRB platform lateral edge surface.

In any of the aspects or embodiments described above and herein, the first end surface of each first rib may converge from a first distal peak surface toward the FRB platform lateral edge surface, and the second end surface of each second rib may converge from a second distal peak surface toward the SRB platform lateral edge surface.

According to an aspect of the present disclosure, a rotor blade is provided that includes an airfoil, an attachment section, a neck section, and a platform. The neck section extends between the attachment section and the airfoil. The platform includes a suction side platform portion, a pressure side platform portion, at least one first rib, and at least one second rib. The suction side platform portion extends laterally outward from the neck section. The suction side platform portion (SSPP) includes an SSPP inner radial surface, an SSPP outer radial surface, and an SSPP lateral edge surface that extends between the SSPP inner and outer radial surfaces. The pressure side platform portion extends laterally outward from the neck section. The pressure side platform portion (PSPP) includes a PSPP inner radial surface, a PSPP outer radial surface, and a PSPP lateral edge surface that extends between the PSPP inner and outer radial surfaces. The first rib extends outwardly from the SSPP inner radial surface and the second rib extends outwardly from the PSPP inner radial surface. The first rib includes a first rib end surface, and the second rib includes a second rib end surface.

In any of the aspects or embodiments described above and herein, the first end surface of the at least one first rib may be spaced apart from the SSPP lateral edge surface, and the second end surface of the at least one second rib may be spaced apart from the PSPP lateral edge surface.

In any of the aspects or embodiments described above and herein, the first end surface of the at least one first rib may converge from a first distal peak surface toward the SSPP lateral edge surface, and the second end surface of the at least one second rib may converge from a second distal peak surface toward the PSPP lateral edge surface.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
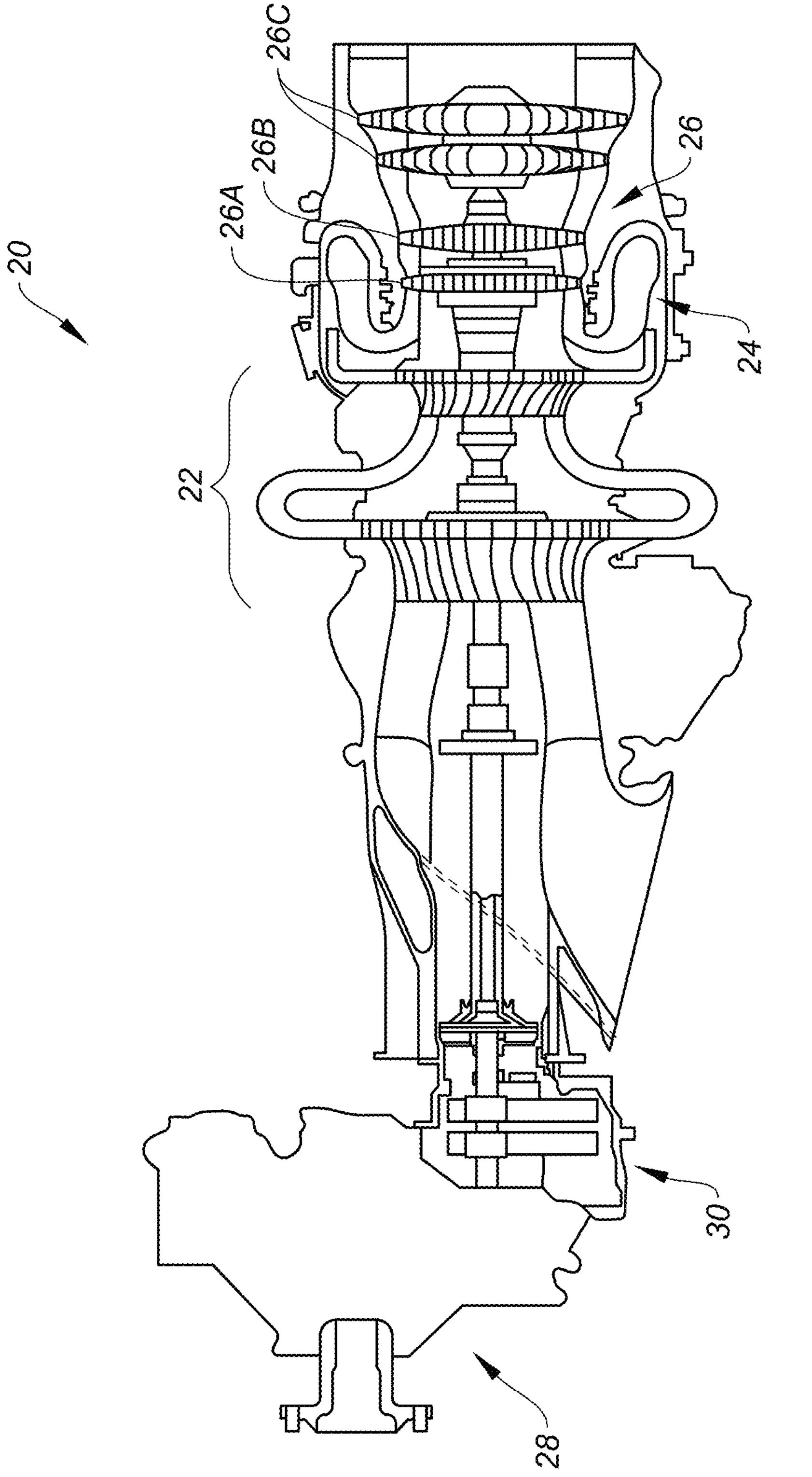
FIG. 1 is a diagrammatic illustration of a gas turbine engine that may utilize embodiments of the present disclosure.

FIG. 1 diagrammatically illustrates a thermal engine in the form of a gas turbine engine 20 that includes a compressor section 22, a combustion section 24, and a turbine section 26. A propulsion unit 28 is shown connected to the gas turbine engine 20 by a reduction gear box 30. Air enters the engine 20 and is worked to a higher pressure and temperature within the compressor section 22. The worked air enters the combustion section 24 and is mixed with fuel and is combusted. The combustion products and any residual air enters the turbine section 26 and drives one or more turbine rotor stages 26A, 26B, 26C. The turbine rotor stages 26A, 26B, 26C, in turn, power the compressor section 22 and the propulsion unit 28. The air (and combustion products in the turbine section 26) follow a gas path that may be referred to as the "core gas path". The present disclosure is not limited to any particular gas turbine engine 20 configuration, and may be used with other thermal engine types including an internal combustion engine.

Figure 2:
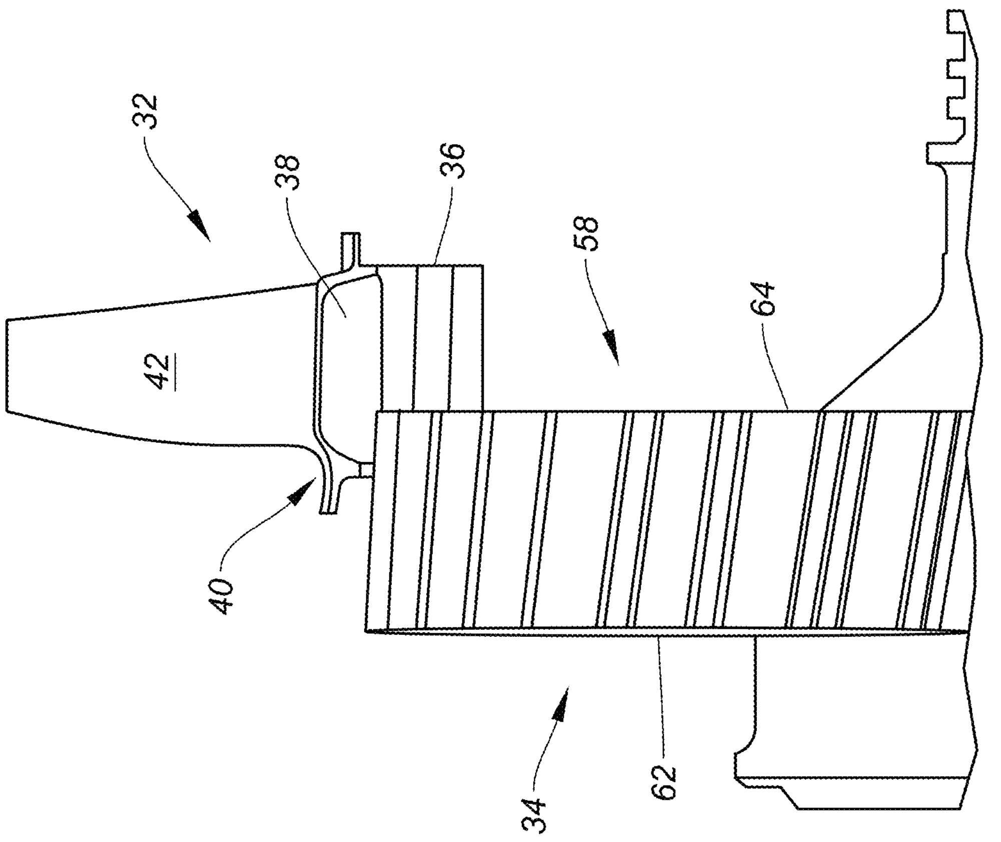
FIG. 2 is diagrammatic representation of a turbine rotor stage disk and a rotor blade.

The gas turbine engine 20 shown diagrammatically in FIG. 1 includes a high pressure turbine rotor stage 26A, a low pressure turbine rotor stage 26B, and a pair of power turbine rotor stages 26C. Each rotor stage 26A, 26B, 26C includes a plurality of rotor blades 32 attached to a disk 34. The rotor blades 32 are circumferentially distributed around the disk 34 and extend radially out from the disk 34. FIG. 2 diagrammatically illustrates a rotor blade 32 engaging with the disk 34 of a rotor stage.

The terms "forward", "leading", "aft, and "trailing" are used herein to indicate the relative position of a component or surface. As core gas air passes through a gas turbine engine 20, a "leading edge" of a stator vane or rotor blade 32 encounters core gas air before the "trailing edge" of the same. In an engine 20 like that shown in FIG. 3, the compressor section 22 is "forward" of the turbine section 26 and the turbine section 26 is "aft" of the compressor section 22. The terms "upstream" and "downstream" used herein refer to the direction of a gas flow passing through an annular gas path of the turbine engine 20. It should also be noted that the terms "radial" and "circumferential" are used herein with respect to the rotational axis of the turbine engine 20.

Figure 3:
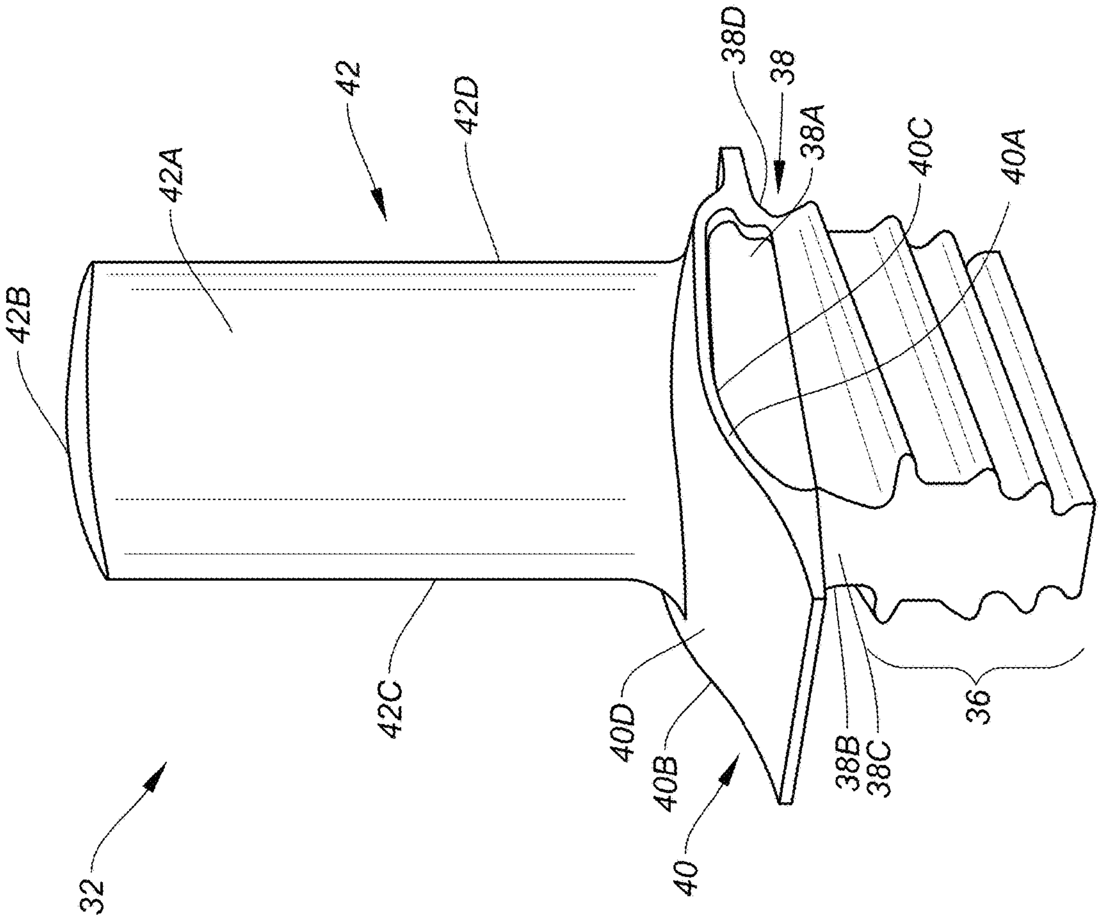
FIG. 3 is a diagrammatic illustration of a rotor blade embodiment.
Figure 4:
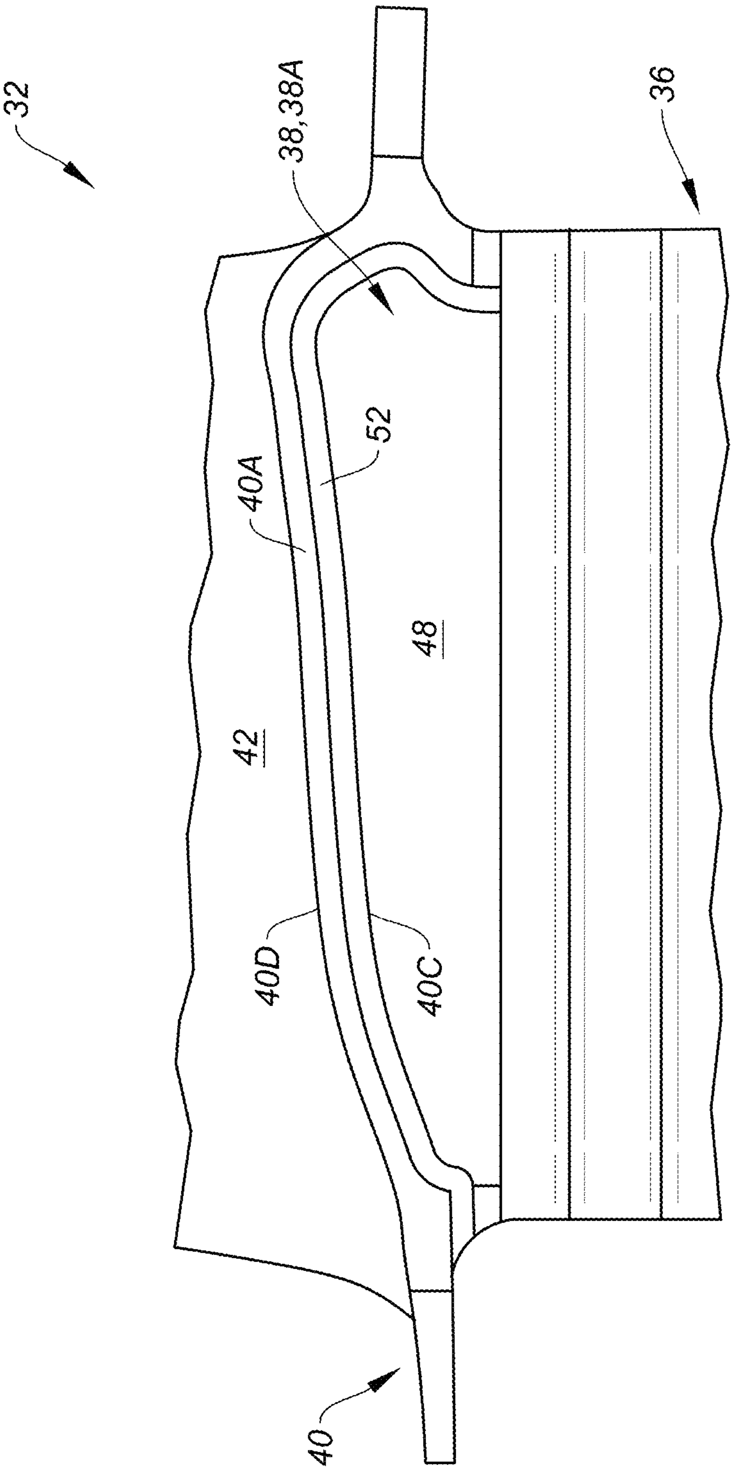
FIG. 4 is a diagrammatic partial view of a rotor blade embodiment shown from the pressure side.
Figure 4A:
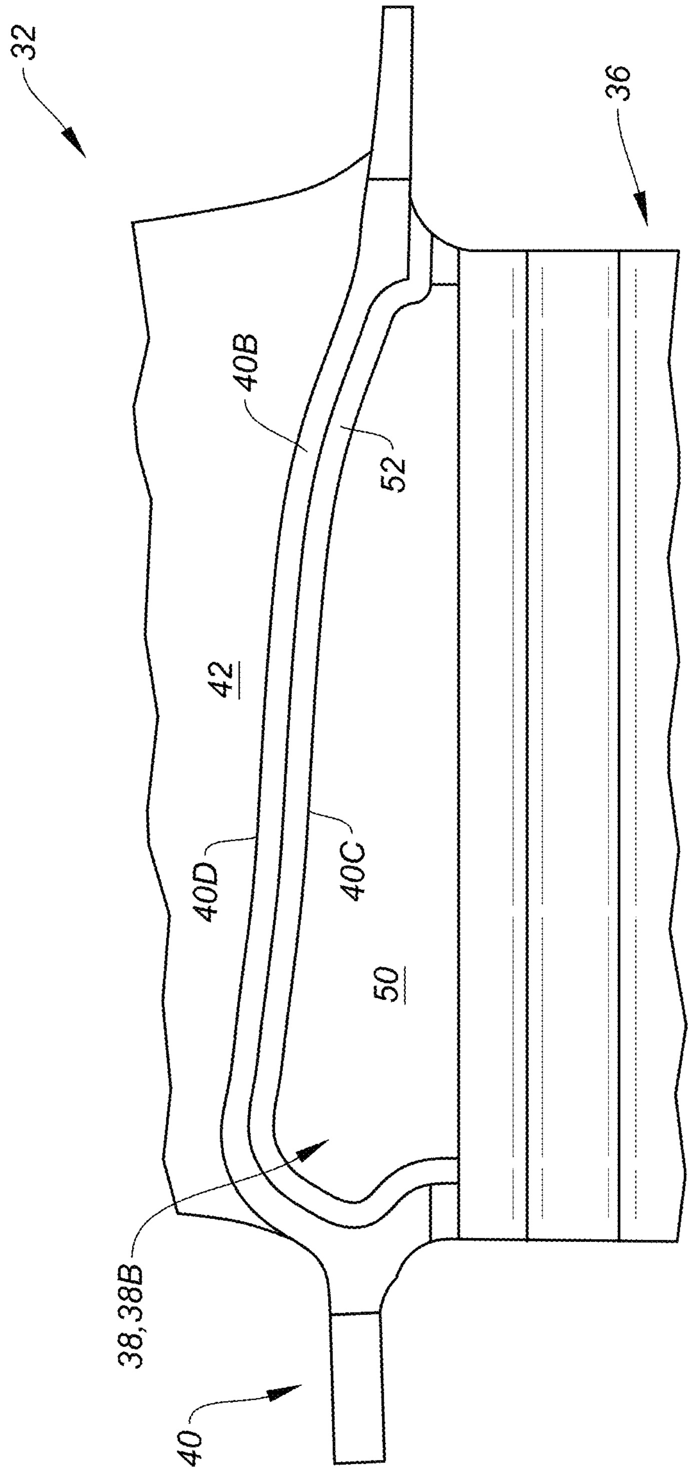
FIG. 4A is a diagrammatic partial view of a rotor blade embodiment shown from the suction side.
Figure 5:
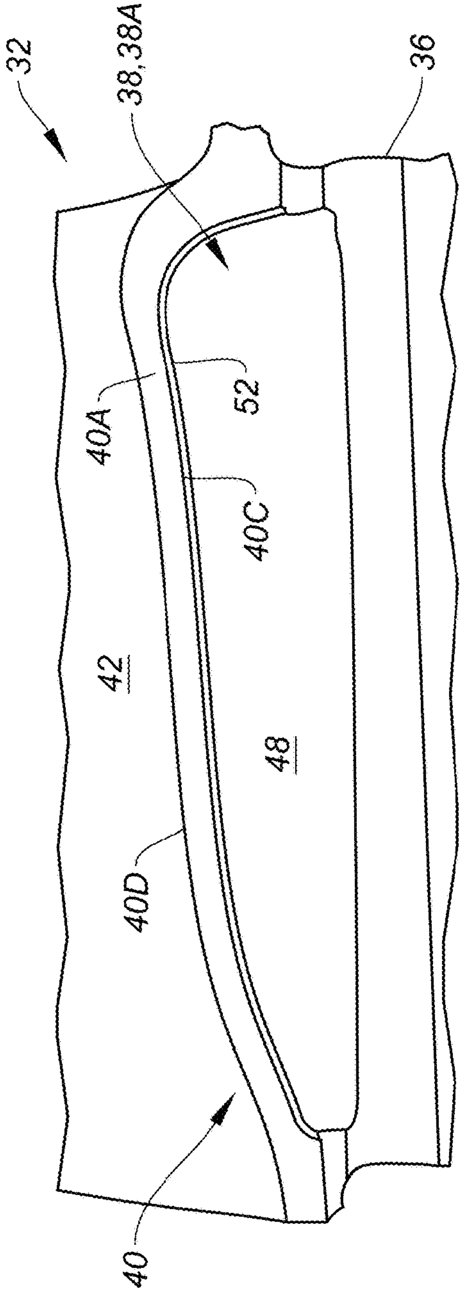
FIG. 5 is a diagrammatic partial view of a rotor blade embodiment shown from the pressure side.

Referring to FIG. 3, each rotor blade 32 includes an attachment section 36 (sometimes referred to as the "root"), a neck section 38, a platform 40, and an airfoil 42. The attachment section 36 of each rotor blade 32 is configured for mating engagement with a respective disk slot 44 disposed within the disk 34 (e.g., see FIG. 2). The neck section 38 extends between the attachment section 36 and the airfoil 42. The neck section 38 may be described as having a pressure side 38A (disposed on the same side of the rotor blade 32 as the pressure side of the airfoil 42), a suction side 38B (disposed on the same side of the rotor blade 32 as the suction side of the airfoil 42), an axially forward end 38C, and an axially aft end 38D. The airfoil 42 includes a suction side 42A, a pressure side 42B, a leading edge 42C, and a trailing edge 42D. The platform 40 extends laterally outward from the neck section 38 on the pressure and suction sides to a respective platform lateral edge surface 40A, 40B, and axially outwardly from the forward end and axially outwardly from the aft end of the neck section 38. The platform 40 includes an inner radial surface 40C and an outer radial surface 40D. The outer radial surface 40D of the platform 40 is contiguous with the airfoil 42. As will be detailed herein, a portion of the inner radial surface 40C and the neck section 38 may be configured to engage with a seal member 46. More specifically and referring to FIGS. 4-5A, in some embodiments the pressure side 38A of the neck section 38 may include a pressure side (PS) cavity 48, or the suction side 38B of the neck section 38 may include a suction side (SS) cavity 50, or the neck section 38 may include both a PS cavity 48 and a SS cavity 50. FIG. 4 illustrates a PS cavity 48 of a present disclosure rotor blade 32 embodiment and FIG. 4A illustrates a SS cavity 50 of the same rotor blade 32 embodiment. FIG. 5 illustrates a PS cavity 48 of another present disclosure rotor blade 32 embodiment and FIG. 5A illustrates a SS cavity 50 of the rotor blade 32 embodiment shown in FIG. 5.

As will be detailed herein, in some embodiments a present disclosure rotor blade 32 may be configured to engage with a seal member 46 having a forward axial locator tab, or a seal member 46 with an aft axial locator tab, or a seal member 46 with both a forward axial locator tab and an aft axial locator tab.

Figure 5A:
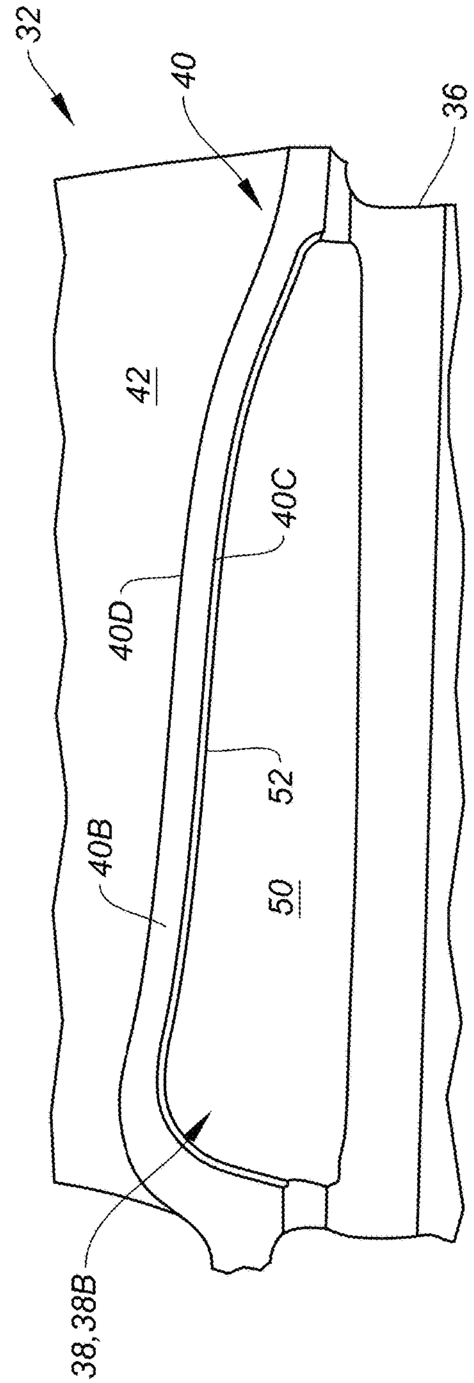
FIG. 5A is a diagrammatic partial view of a rotor blade embodiment shown from the suction side.
Figure 13:
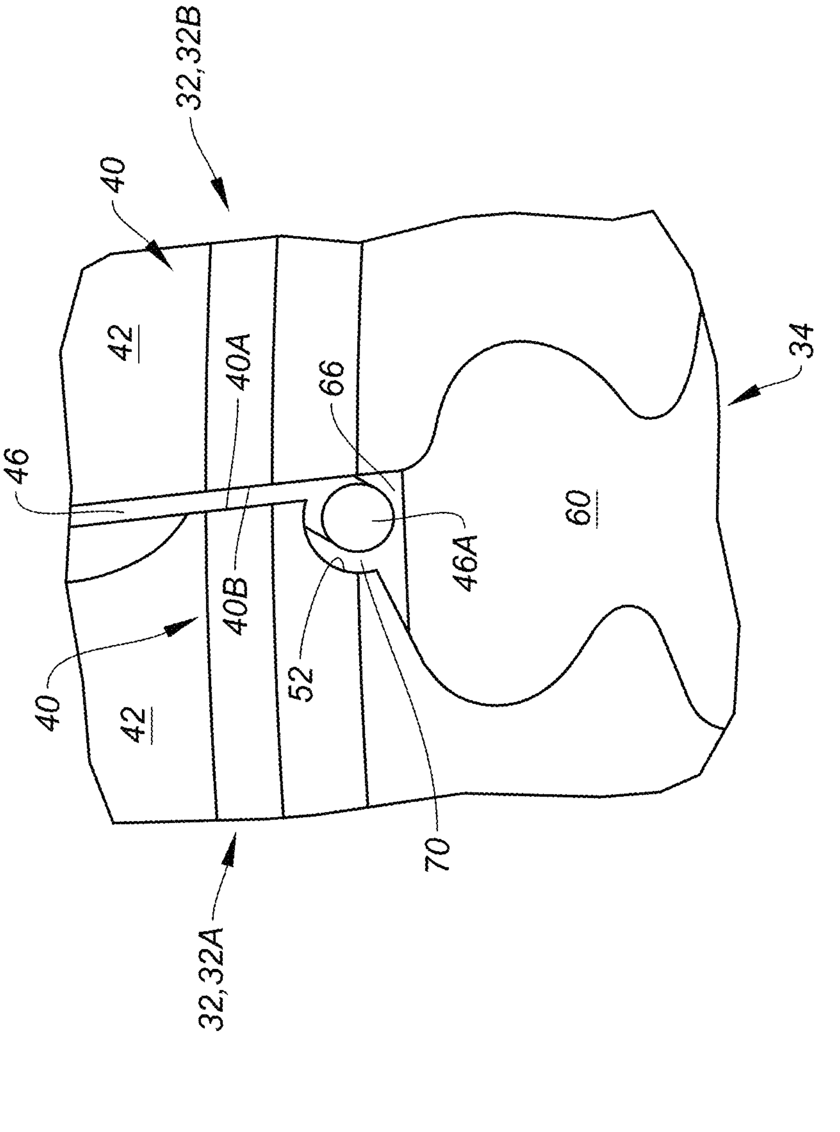
FIG. 13 is a diagrammatic illustration of a present disclosure seal member embodiment engaged with a pair of adjacent rotor blades and a disk.
Figure 15:
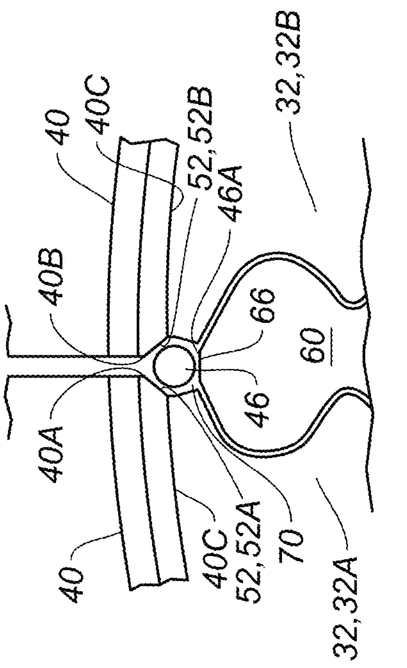
Figure 14:
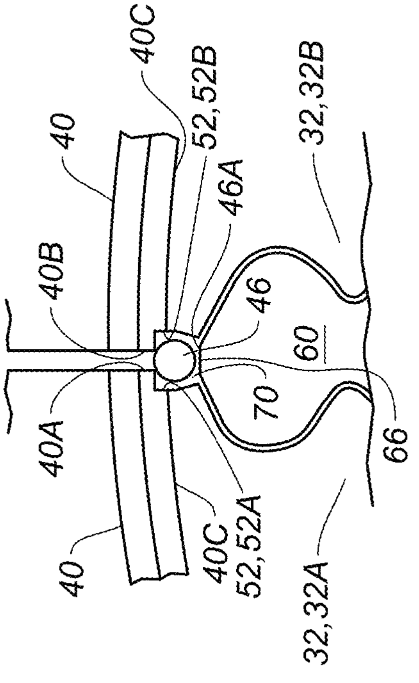
FIG. 14 is a diagrammatic illustration of a present disclosure seal member embodiment engaged with a pair of adjacent rotor blades and a disk.

Referring to FIGS. 4, 4A, 5, and 5A, a rotor blade 32 according to the present disclosure may include a platform channel 52 configured to receive a portion of a seal member 46. In some embodiments, a platform channel 52 may be disposed at the edge of the platform 40 (e.g., extending between the inner radial surface 40C of the platform 40 and the lateral edge 40A of the platform 40) only on the pressure side of the rotor blade platform 40, or a platform channel 52 may be disposed at the lateral edge 40B of the platform 40 only on the suction side of the rotor blade platform 40, or platform channels 52 may be disposed at the lateral edges 40A, 40B of the platform 40 on both the pressure and the suction sides of the rotor blade platform 40. FIGS. 4-5A illustrate platform channels 52 disposed on both the pressure and the suction sides of the rotor blade platform 40. FIGS. 13-15 (detailed herein) illustrate non-limiting examples of platform channels 52.

Aspects of the present disclosure include a rotor stage that includes a seal member 46 disposed between adjacent rotor blades 32 within a rotor stage. The seal member 46 impedes or prevents migration of high temperature core gas passing through the core gas path between the platforms 40 of adjacent rotor blades 32 within the rotor stage. The rotor blade platforms 40 define an inner radial boundary of the core gas path and the rotor blades 32 are disposed in the core gas path. The present disclosure may be used with different turbine rotor stages within the gas turbine engine 20 including any of the high pressure turbine rotor stage 26A, the low pressure turbine rotor stage 26B, or the power turbine rotor stages 26C shown in FIG. 1.

Figure 6:
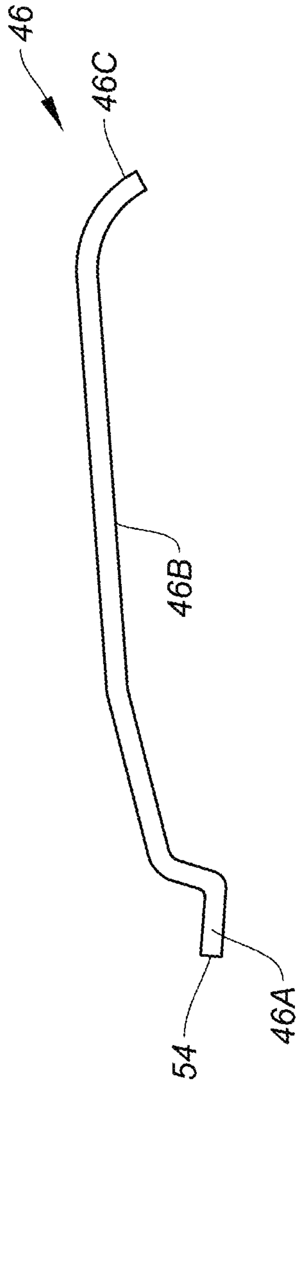
FIG. 6 is a diagrammatic illustration of a present disclosure seal member embodiment.
Figure 7:
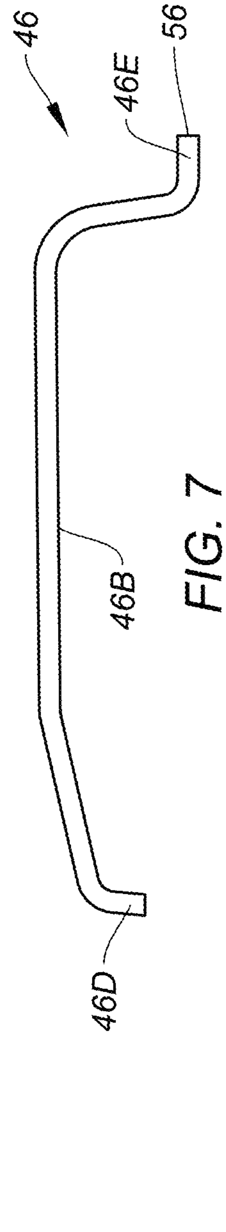
FIG. 7 is a diagrammatic illustration of a present disclosure seal member embodiment.
Figure 8:
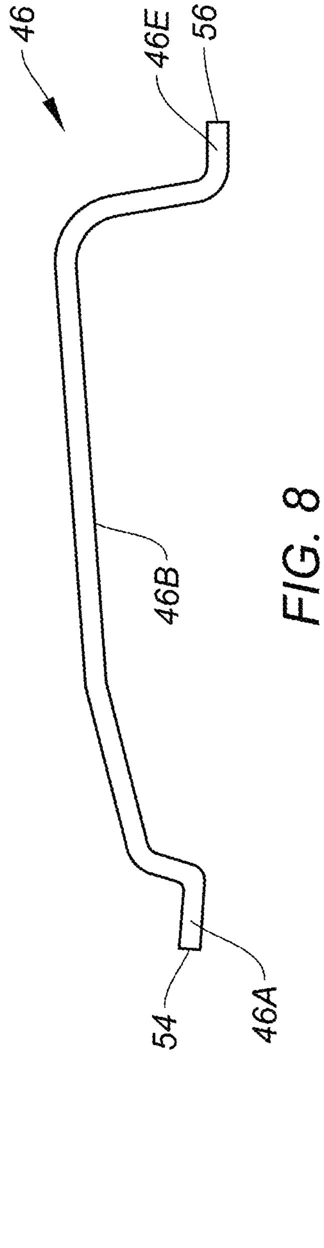
FIG. 8 is a diagrammatic illustration of a present disclosure seal member embodiment.

FIGS. 6-8 diagrammatically illustrate present disclosure seal member 46 embodiments. The seal member 46 embodiment diagrammatically shown in FIG. 6 includes a forward axial locator tab 46A, a central segment 46B, and an aft segment 46C. The seal member 46 embodiment diagrammatically shown in FIG. 7 includes a forward segment 46D, a central segment 46B, and an aft axial locator tab 46E. The seal member 46 embodiment diagrammatically shown in FIG. 8 includes a forward axial locator tab 46A, a central segment 46B, and an aft axial locator tab 46E. The elements of the seal member 46 embodiments shown in FIGS. 6-8 (e.g., the forward axial locator tab 46A, the forward segment 46D, the central segment 46B, the aft segment 46C, or the aft axial locator tab 46E, or any combination thereof) may each have a uniform cross-sectional geometry; e.g., circular, oval, elliptical, triangular, or the like, or any combination thereof. To facilitate the description herein, the seal member 46 will be described as having a circular cross-sectional geometry but the present disclosure is not limited thereto. The forward axial locator tab 46A may be described as having a distal end surface 54, and the aft axial locator tab 46E may be described as having a distal end surface 56. The present disclosure seal members 46 are configured to substantially mate with surfaces of each rotor blade 32 of a pair of adjacent rotor blades 32 to provide sealing of the gap between the adjacent platforms 40 of the adjacent rotor blades 32; e.g., the seal members 46 are configured to mate with a portion of the inner radial surface 40C of a blade platform 40, or with surfaces of the PS cavity 48 or the SS cavity 50, or the like, or any combination thereof. The present disclosure is not limited to the geometric configurations of the seal member 46 examples shown in FIGS. 6-8.

Figure 9:
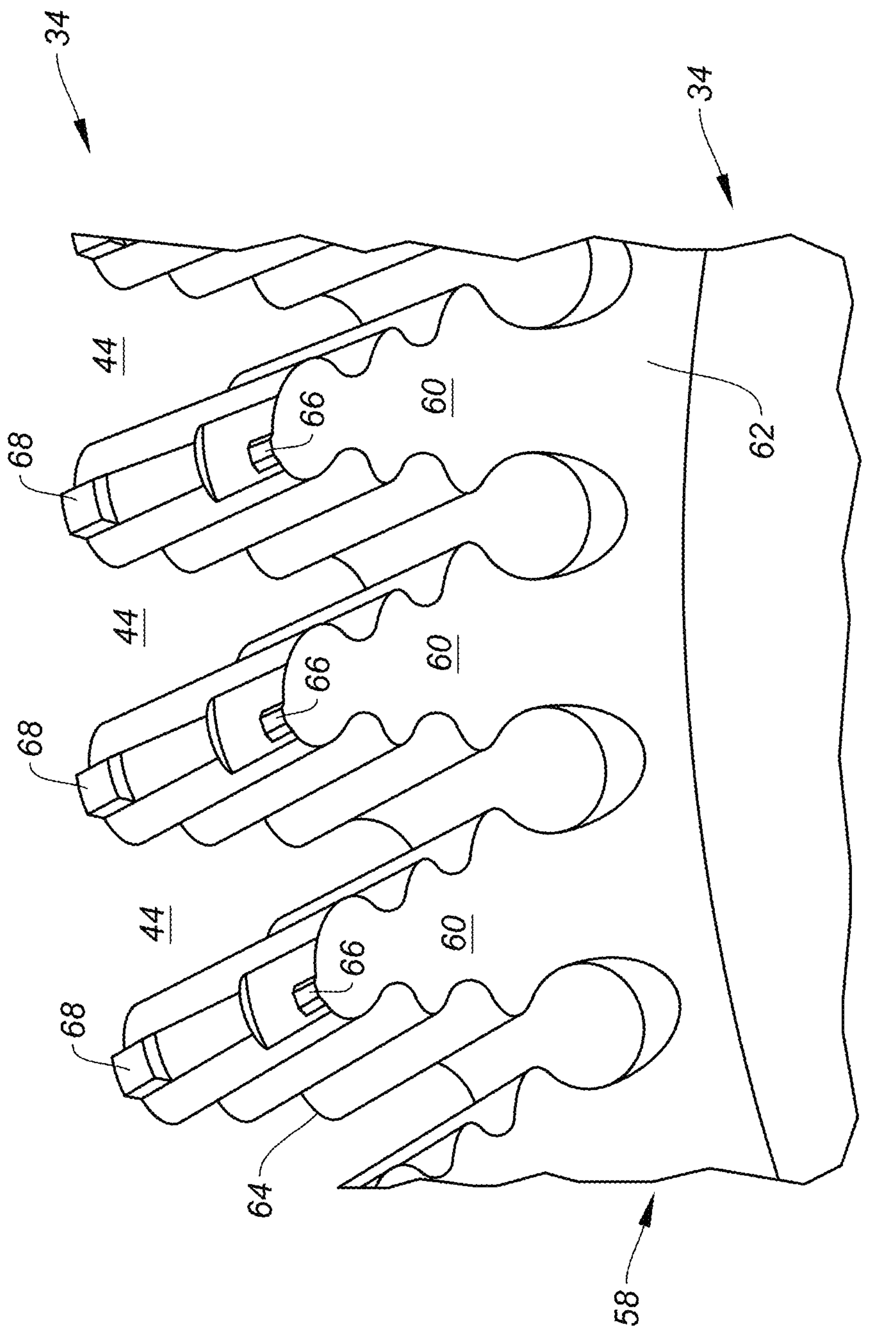
FIG. 9 is a diagrammatic partial view of a present disclosure rotor stage disk embodiment.
Figure 9B:
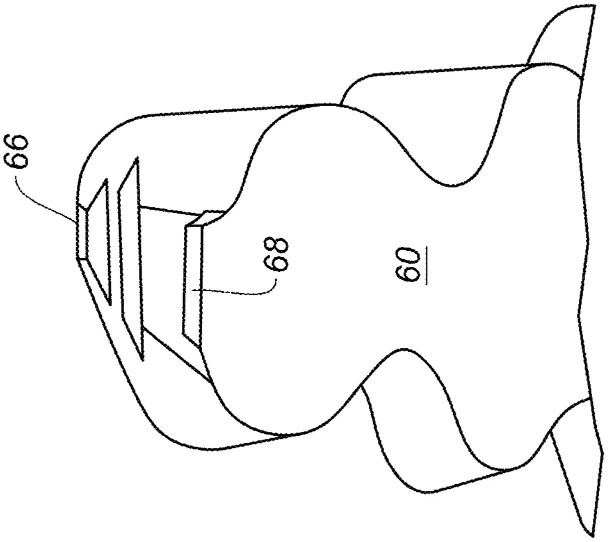
FIG. 9B is an enlarged view of a portion of the rotor stage disk embodiment shown in FIG. 9.
Figure 9A:
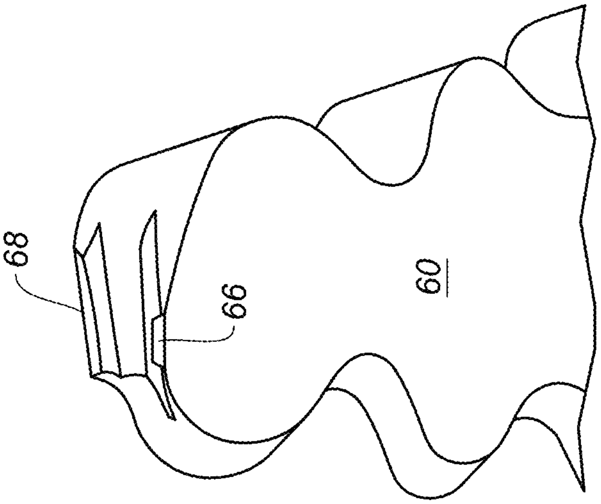
FIG. 9A is an enlarged view of a portion of the rotor stage disk embodiment shown in FIG. 9.

FIG. 9 diagrammatically illustrates a portion of a disk 34, showing a plurality of disk slots 44 disposed in the rim 58 of the disk 34. As disclosed herein, each disk slot 44 has a geometric configuration that mates with the attachment section 36 of a rotor blade 32 (e.g., see FIG. 3). In the embodiment shown in FIG. 9, the disk slots 44 have a multi-groove configuration often referred to as a "fir tree" configuration, but that is not required. The outer radial portion of the disk rim 58 disposed between adjacent disk slots 44 may be referred to as an inter-slot segment 60 that extends between a forward axial end surface 62 disposed at a forward end of the disk 34 and an aft axial end surface 64 disposed an aft end of the disk 34. In those present disclosure embodiments that include a seal member 46 that includes a forward axial locator tab 46A, the inter-slot segment 60 includes a forward tab mating surface 66 disposed contiguous with the forward end of the disk 34. In those present disclosure embodiments that include a seal member 46 that includes an aft axial locator tab 46E, the inter-slot segment 60 includes an aft tab mating surface 68 disposed contiguous with the aft end of the disk 34. The disk 34 embodiment shown in FIG. 9, includes inter-slot segments 60 that include both a forward tab mating surface 66 and an aft tab mating surface 68. FIG. 9A illustrates in enlarged fashion a disk rim 58 portion disposed between a pair of disk slots 44, showing an inter-slot segment 60 having both a forward tab mating surface 66 and an aft tab mating surface 68 in a view direction from forward to aft. FIG. 9B illustrates the same disk rim 58 portion in a view direction from aft to forward. As can be seen in FIGS. 9-9B, the forward tab mating surface 66 and/or the aft tab mating surface 68 may be raised surfaces relative to the other surfaces at the outer radial portion of the disk rim 58. The forward tab mating surface 66 and the aft tab mating surface 68 are shown in FIGS. 9-9B as planar surfaces, but the present disclosure is not limited to planar tab mating surfaces 66, 68.

As will be detailed herein, the forward tab mating surface 66 is configured to mate generally with the respective forward axial locator tab 46A of a seal member 46, and the aft tab mating surface 68 is configured to mate generally with the respective aft axial locator tab 46E of a seal member 46. The phrase "mate generally" is used to refer to the forward and/or aft tab mating surface 66, 68 being configured to be a one of a plurality of surfaces that collectively form a tab slot 70 (e.g., see FIG. 13) that receives a forward axial locator tab 46A or an aft axial locator tab 46E.

FIGS. 10-12A diagrammatically illustrate a rotor blade 32 mounted within a disk 34 and a seal member 46 engaged with the rotor blade 32 and the disk 34.

Figure 10:
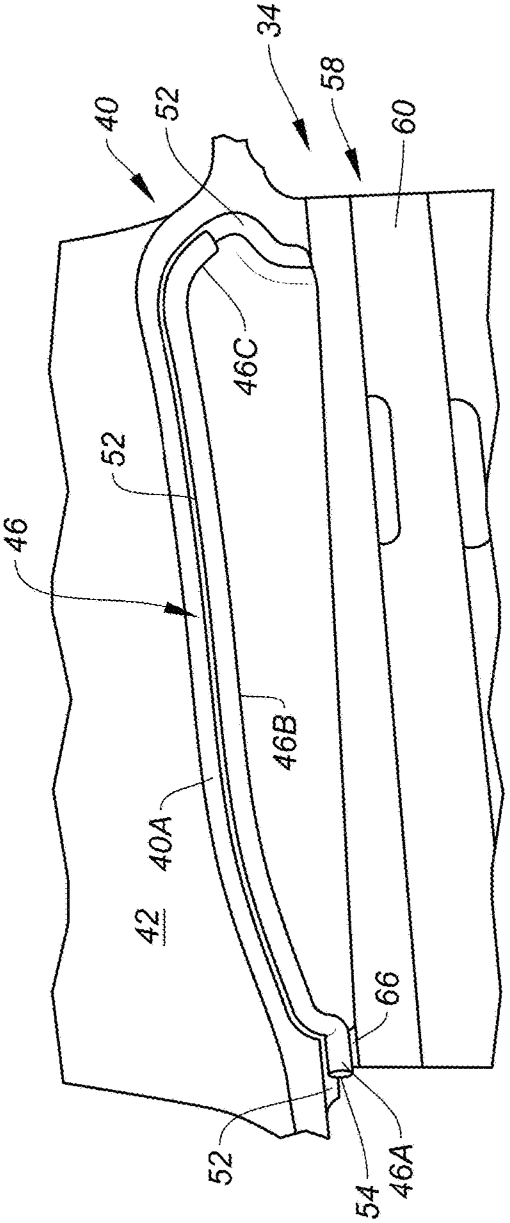
FIG. 10 is a diagrammatic planar view of a present disclosure seal member embodiment engaged with a rotor blade and disk.
Figure 10A:
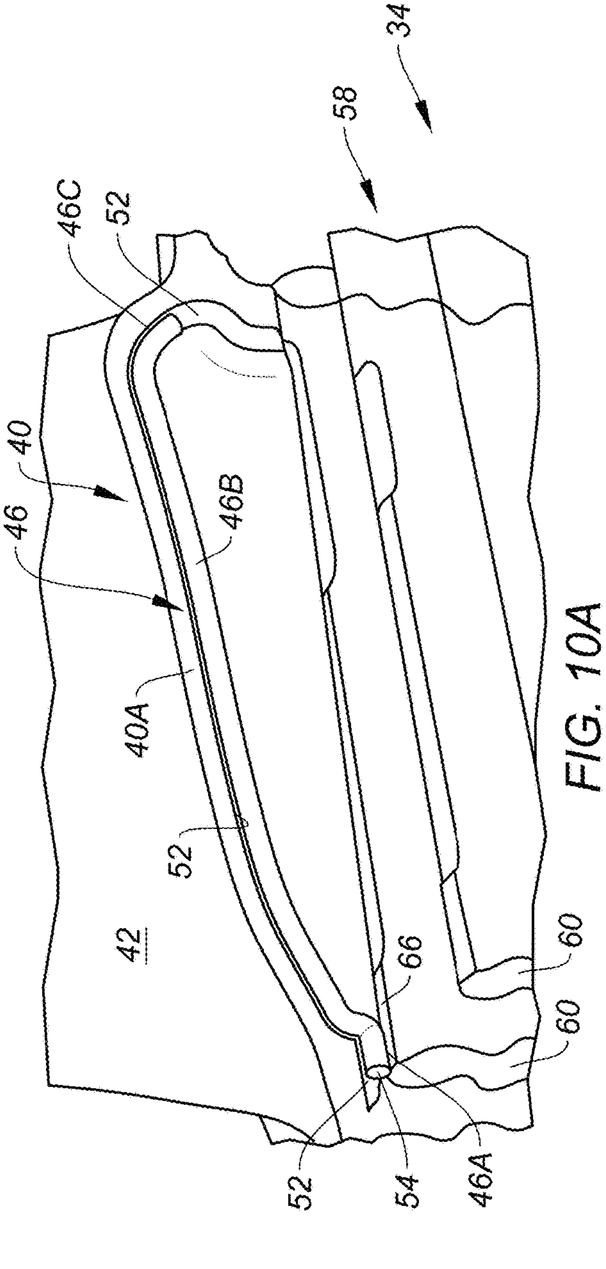
FIG. 10A is a diagrammatic perspective view of the present disclosure seal member embodiment shown in FIG. 10 engaged with a rotor blade and disk.

In the embodiment shown in FIGS. 10 and 10A, the seal member 46 includes a forward axial locator tab 46A, a central segment 46B, and an aft segment 46C. The central segment 46B and the aft segment 46C are engaged with a platform channel 52 disposed at the lateral edge surface of the platform 40. In this embodiment, a platform channel 52 extends forward of the respective PS cavity 48 and/or the SS cavity 50, and the forward axial locator tab 46A is disposed within the portion of the platform channel 52 extending forward of the respective PS cavity 48 and/or the SS cavity 50.

Figure 11:
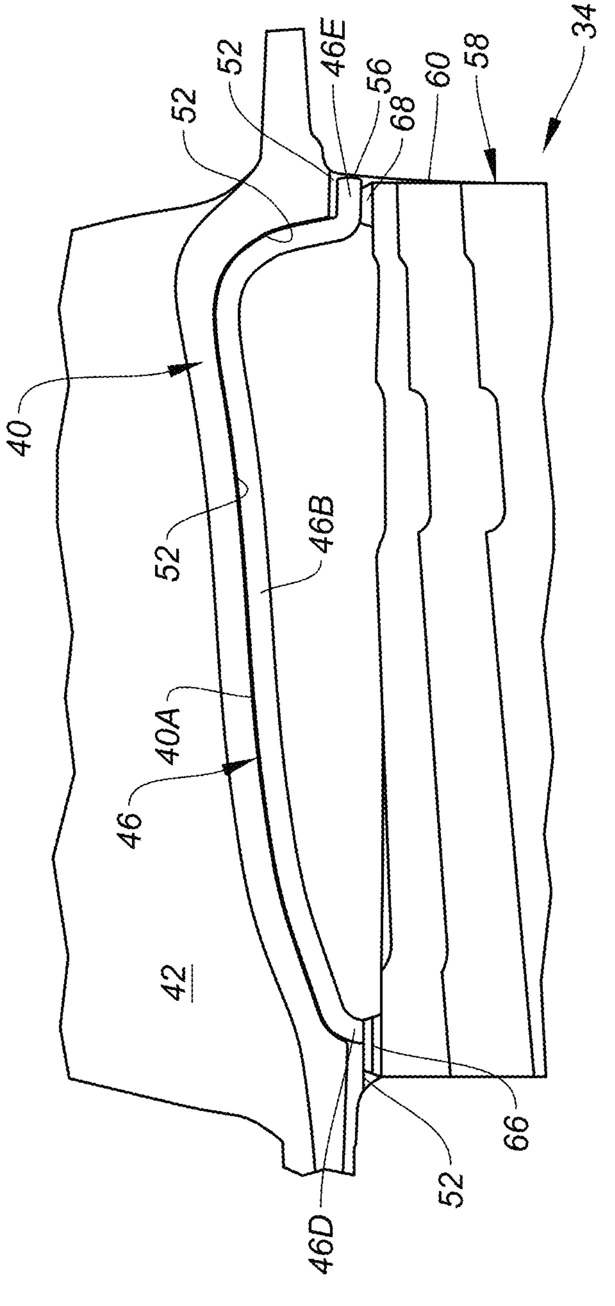
FIG. 11 is a diagrammatic planar view of a present disclosure seal member embodiment engaged with a rotor blade and disk.

In the embodiment shown in FIG. 11, the seal member 46 includes a forward segment 46D, a central segment 46B, and an aft axial locator tab 46E. The forward segment 46D and the central segment 46B are engaged with a platform channel 52 disposed at the lateral edge surface 40A of the platform 40. In this embodiment, a platform channel 52 extends aft of the respective PS cavity 48 and/or the SS cavity 50, and the aft axial locator tab 46E is disposed within the portion of the platform channel 52 extending aft of the respective PS cavity 48 and/or the SS cavity 50.

Figure 12:
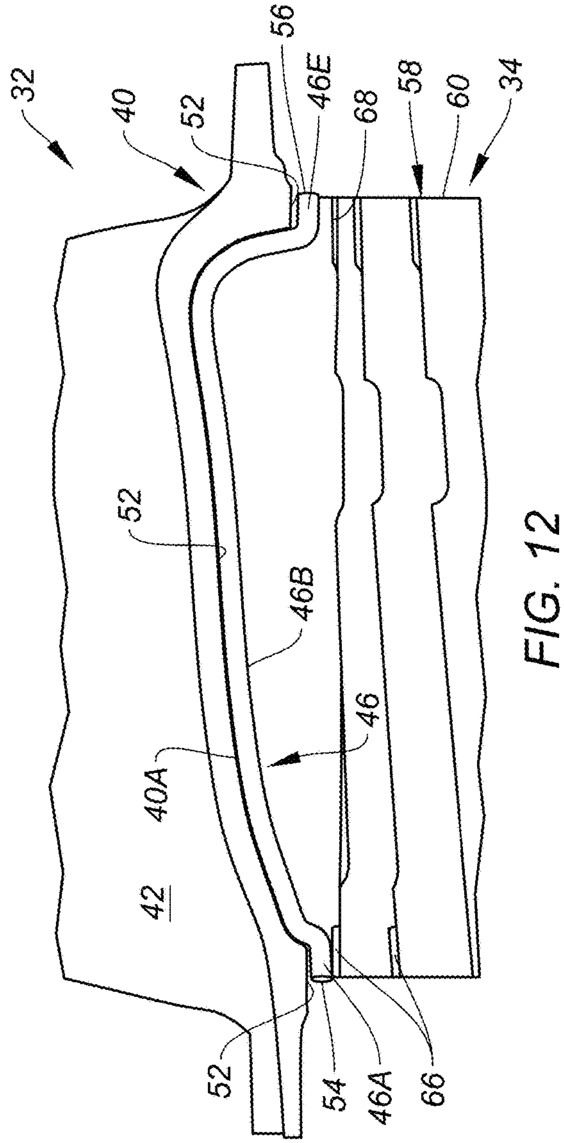
FIG. 12 is a diagrammatic planar view of a present disclosure seal member embodiment engaged with a rotor blade and disk.
Figure 12A:
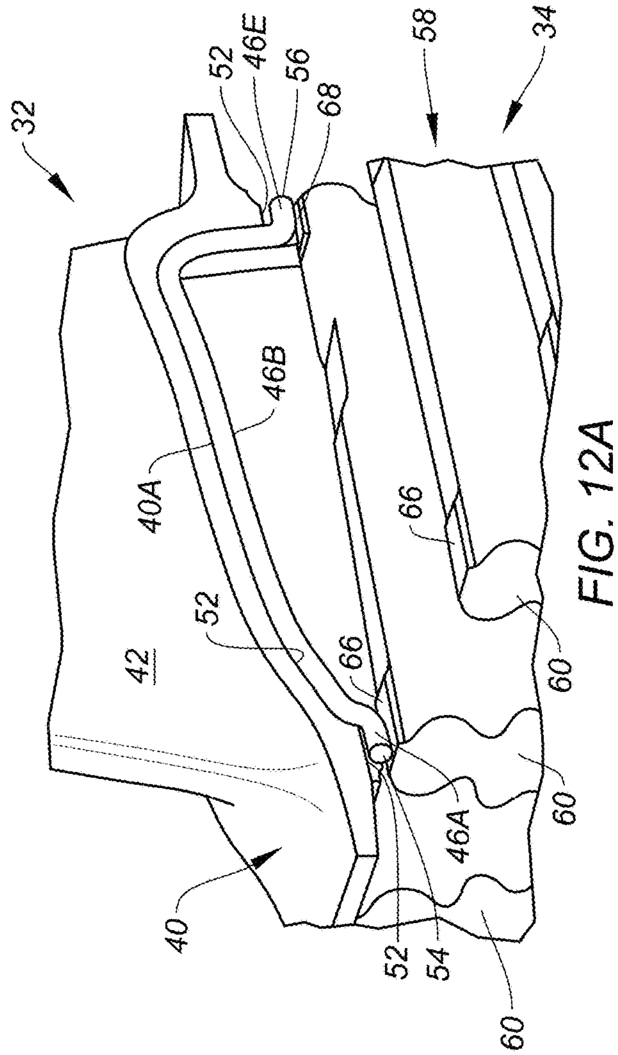
FIG. 12A is a diagrammatic perspective view of the present disclosure seal member embodiment shown in FIG. 12 engaged with a rotor blade and disk.

In the embodiment shown in FIGS. 12 and 12A, the seal member 46 includes a forward axial locator tab 46A, a central segment 46B, and an aft axial locator tab 46E. The central segment 46B is engaged with a platform channel 52 disposed at the lateral edge surface of the platform 40. In this embodiment, a platform channel 52 extends aft of the respective PS cavity 48 and/or the SS cavity 50, and forward of the respective PS cavity 48 and/or the SS cavity 50. The forward axial locator tab 46A is disposed within the portion of the platform channel 52 extending forward of the respective PS cavity 48 and/or the SS cavity 50, and the aft axial locator tab 46E is disposed within the portion of the platform channel 52 extending aft of the respective PS cavity 48 and/or the SS cavity 50.

In some embodiments the seal member 46 forward axial locator tab 46A (and/or the aft axial locator tab 46E) may engage with the adjacent rotor blade 32 by abutting with the adjacent rotor blade 32. FIG. 13 diagrammatically illustrates an example wherein a tab slot 70 is collectively formed by a platform channel 52 (e.g., having an arcuate shape) disposed in the platform lateral edge surfaces 40A of one of the adjacent rotor blades 32 (i.e., the rotor blade 32A on the left), the platform lateral edge surface 40B of the other of the adjacent rotor blades 32 (i.e., the rotor blade 32B on the right), and the tab mating surface 66 of the inter-slot segment 60 of the disk 34.

In some embodiments, the tab slot 70 may be collectively formed by platform channels 52 disposed in adjacent rotor blade platforms 40 and a tab mating surface 66, 68 of an inter-slot segment 60 of the disk 34. FIG. 14 diagrammatically illustrates an example wherein a tab slot 70 is collectively formed by an L-shaped platform channel 52A disposed in the platform lateral edge surface 40A of one of the adjacent rotor blades 32 (i.e., the rotor blade 32A on the left), an L-shaped platform channel 52B disposed in the platform lateral edge surface 40B of the other of the adjacent rotor blades 32 (i.e., the rotor blade 32B on the right), and the tab mating surface 66 of the inter-slot segment 60 of the disk 34. In this embodiment, the tab slot 70 has a generally rectangular shape. FIG. 15 diagrammatically illustrates an example wherein a tab slot 70 is collectively formed by a surface defining a platform channel 52A extending between the platform lateral edge surface 40A and the inner radial surface 40C of the platform 40 of one of the adjacent rotor blades 32 (i.e., the rotor blade 32A on the left), a surface defining a platform channel 52B extending between the platform lateral edge surface 40B and the inner radial surface 40C of the platform 40 of the other of the adjacent rotor blades 32 (i.e., the rotor blade 32B on the right), and the tab mating surface 66 of the inter-slot segment 60 of the disk 34. In this embodiment, the tab slot 70 has a generally triangular shape; e.g., the surfaces converge toward one another (in a direction from inner radial to outer radial) to decrease the distance therebetween. The tab slot 70 configurations are provided herein to illustrate possible tab slot 70 configurations and the present disclosure is not limited to these examples.

Figure 16:
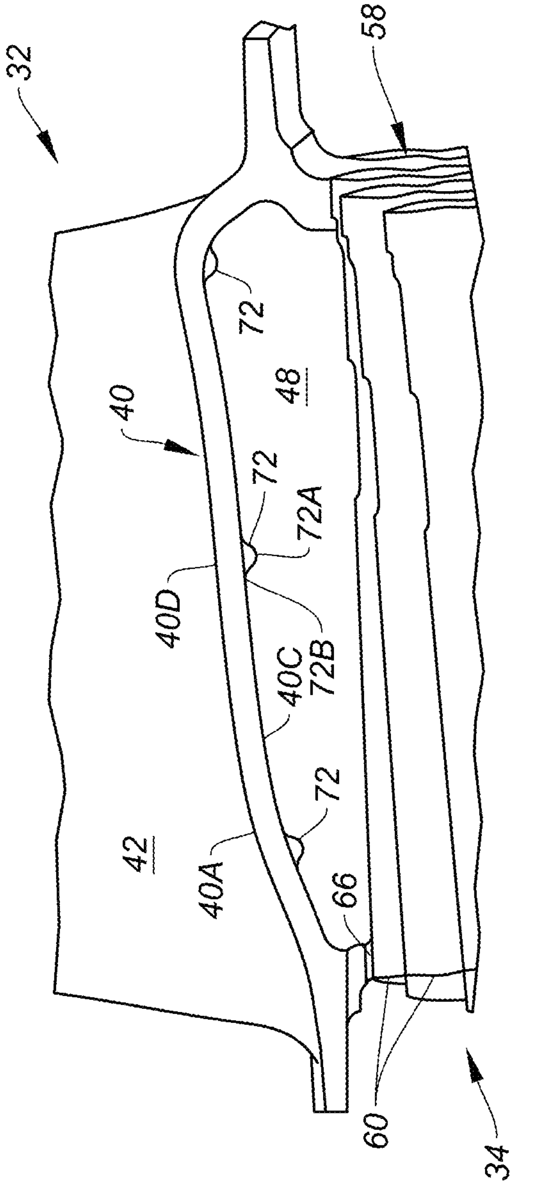
FIG. 16 is a diagrammatic planar side view of a present disclosure rotor blade embodiment.
Figure 16A:
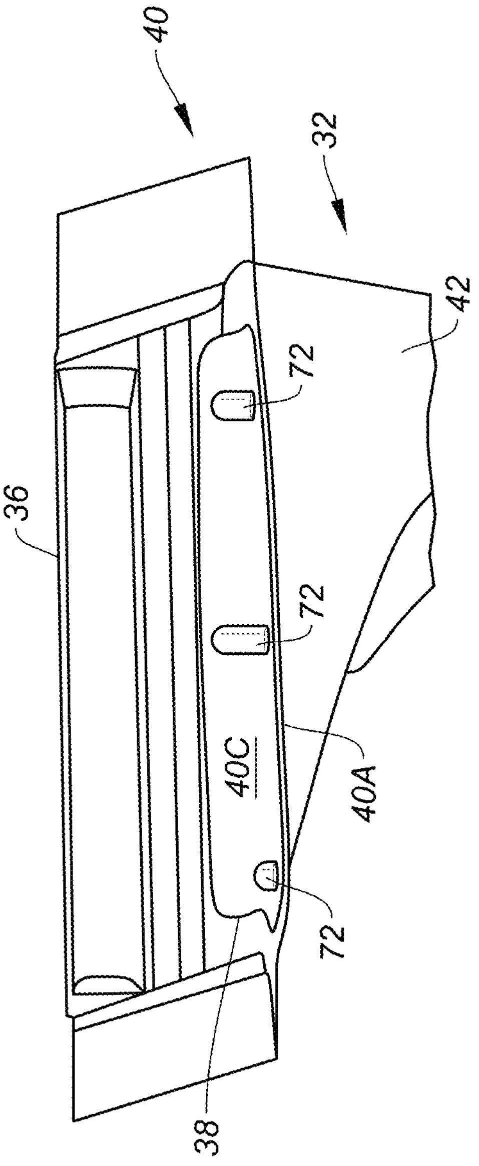
FIG. 16A is a diagrammatic planar bottom view of the present disclosure rotor blade embodiment shown in FIG. 16.
Figure 16B:
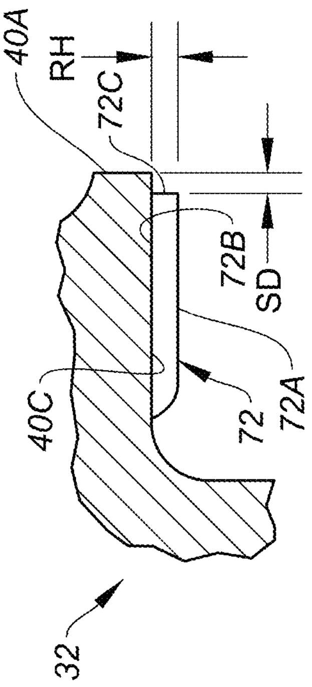
FIG. 16B is a diagrammatic view of a portion of a present disclosure rotor blade embodiment, illustrating a locating rib embodiment.
Figure 16C:
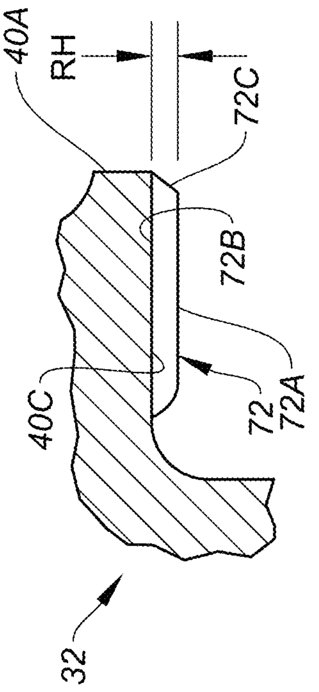
FIG. 16C is a diagrammatic view of a portion of a present disclosure rotor blade embodiment, illustrating a locating rib embodiment.

Referring to FIGS. 16-16C, in some embodiments a rotor blade 32 according to the present disclosure may include locating ribs 72 extending outwardly from the inner radial surface 40C of a rotor blade platform 40. The locating ribs 72 are configured to position the seal member 46 relative to the lateral edge 40A of the platform 40, and therefore position the seal member 46 relative to the gap disposed between the platform lateral edges 40A, 40B of the adjacent rotor blades 32. In the embodiment shown in FIGS. 16 and 16A, each of the three locating ribs 72 have a peaked shape; e.g., each extends height wise from a distal peak surface 72A to a base surface 72B located at the inner radial surface 40C of the rotor blade platform 40. Each locating rib 72 has a rib height (e.g., "RH"-see FIG. 16B) and an end surface 72C. In some embodiments, the end surfaces 72C may be configured to mate with a seal member 46. For example, in FIGS. 16, 16A, and 16B the locating ribs 72 are shown having a planar end surface 72C, separated from the platform lateral edge surface by a distance "SD". The separation distance "SD" is selected based on the cross-sectional geometry of the seal member 46 (e.g., the diameter). For a circular cross-sectional seal member 46, the separation distance may be chosen such that the seal member 46 is maintained substantially centered on the gap between the adjacent rotor blade lateral end surfaces 40A, 40B; see FIGS. 14 and 15 for opposing lateral end surfaces 40A, 40B. In the embodiment shown in FIG. 16C, the rib end surface 72C converges toward the platform lateral edge surface 72A from the distal peak surface 72A. In the embodiment shown in FIGS. 16 and 16A, the locating ribs 72 are disposed on the pressure side of the platform 40. In some embodiments, the adjacent rotor blade 32 may include locating ribs 72 extending outwardly from the inner radial surface 40C of its rotor blade platform 40 on the suction side. In this embodiment, the locating ribs 72 on the adjacent pressure side and suction side platforms 40 are configured to collectively position the seal member 46 relative to the respective platform lateral edges 40A, 40B and therefore the gap therebetween. The present disclosure may include any number of locating ribs 72 sufficient to position the seal member 46 relative to the lateral edge of the platform 40, and is not limited to any particular locating rib 72 cross-sectional geometry and/or any end surface geometry.

Figure 17:
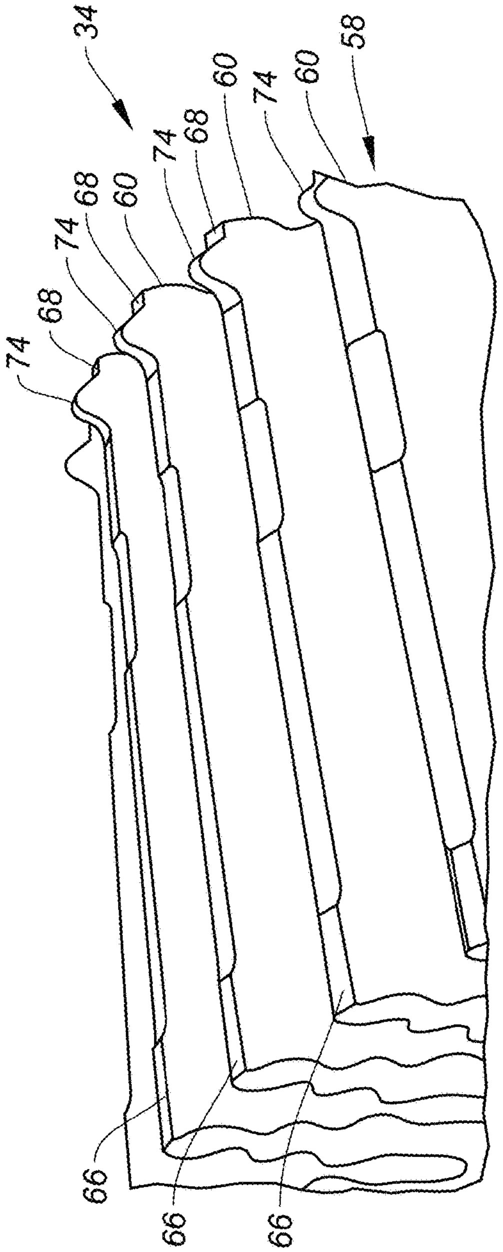
FIG. 17 is a diagrammatic partial perspective view of a present disclosure rotor stage disk embodiment.
Figure 17A:
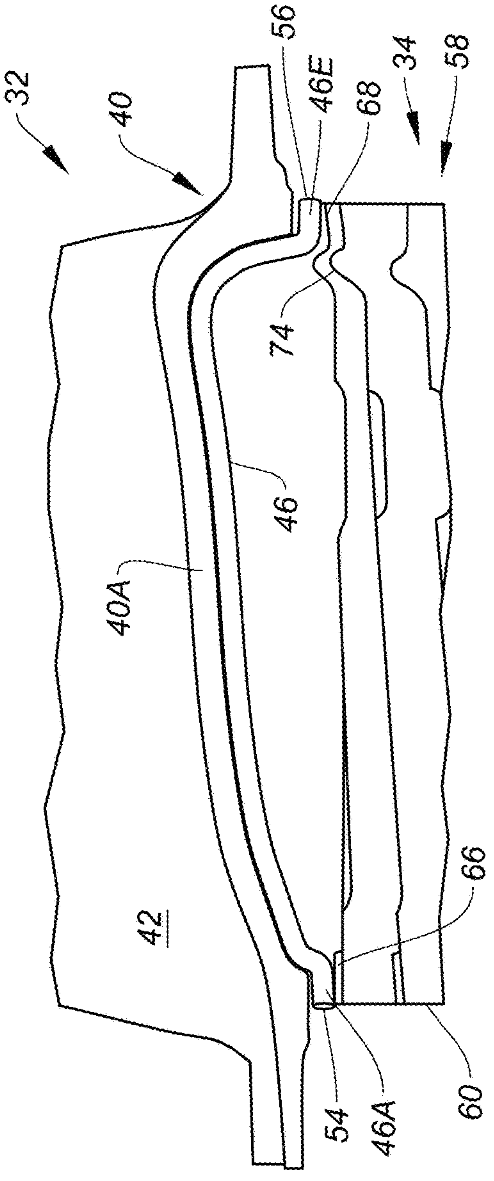
FIG. 17A is a diagrammatic planar view of the rotor stage disk embodiment shown in FIG. 17 with a rotor blade and seal member engaged with the disk.
Figure 17B:
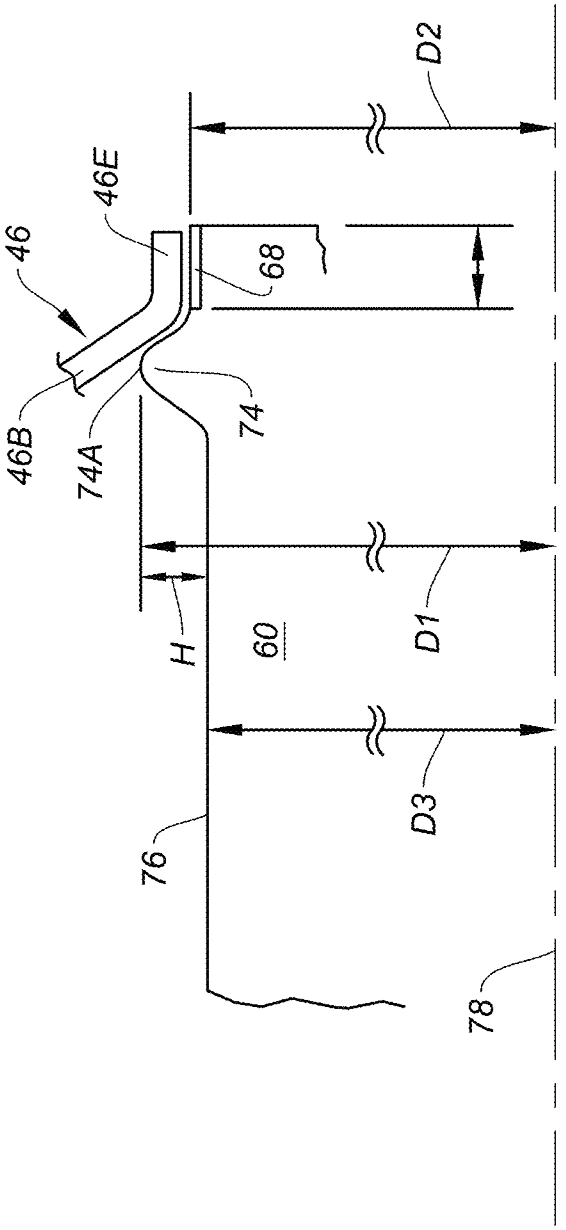
FIG. 17B is a diagrammatic representation of a portion of the rotor stage disk embodiment shown in FIG. 17.

In some embodiments, the inter-slot segments 60 of the disk 34 may include seal member retaining feature 74 that extends outwardly in a radial direction from the outer radial surface of each inter-slot segment 60. The retaining feature 74 is configured to mate with a seal member 46 to axially locate the seal member 46. In some embodiments, the retaining feature 74 may be contiguous with a tab mating surface; e.g., aft tab mating surface 68. FIGS. 17-17B diagrammatically illustrate an example of a disk 34 having a retaining feature 74 that extends outwardly in a radial direction from the outer radial surface 76 of each inter-slot segment 60, contiguous with the aft tab mating surface 68. The retaining feature 74 is arcuately shaped (e.g., having a shape generally like an inverted V) with a height "H". The height H may be defined as the distance between the outer radial surface 76 of the inter-slot segment 60 and a distal peak surface 74A of the retaining feature 74. The location and configuration of the locating feature 74 is selected to facilitate axial positioning of the seal member 46. The distal peak surface 74A is disposed at a first radial distance ("D1") from the disk rotational axis 78, and the seal engagement surface 68 is disposed a second radial distance ("D2") from the rotational axis 78, wherein the first radial distance is greater than the second radial distance (D1>D2). The outer radial surface 76 is disposed at a third radial distance ("D3") from the disk rotational axis 78. In some embodiments, the first radial distance may be greater than the third radial distance (D1>D3). The present disclosure is not limited to the example locating feature 74 shown in shown on FIGS. 17-17B, nor is the present disclosure limited to locating features 74 disposed contiguous with an aft tab mating surface 68; e.g., in some present disclosure disk 34 embodiments, locating features 74 may be disposed contiguous with forward tab mating surfaces 66.

During assembly of the rotor stage, it is common for the rotor blades 32 to be axially slid into engagement with the disk 34 from the axial end of the disk 34, with the rotor blades 32 being moved axially forward relative to the disk 34. For example, all of the rotor blades 32 may be engaged with the disk 34 from the aft end of the disk 34 by a limited amount; e.g., about ten percent of the axial length of the rotor blade neck sections 38. During this initial disk 34 engagement process, each respective seal member 46 is disposed between a respective adjacent pair of rotor blades 32. In those present disclosure embodiments wherein the seal members 46 include a forward axial locator tab 46A, the forward axial locator tab 46A can be seen when the rotor assembly is viewed in a direction from the forward end towards the aft end. Hence, the forward axial locator tabs 46A provide an indication to the technician assembling the rotor stage that the seal members 46 are properly positioned. The outer radial surfaces of the disk inter-slot segments 62 and the seal member 46 embodiments are configured to allow the forward axial locator tab 46A and/or the aft axial locator tab 46E to be inserted with the rotor blades 32 into the disk; e.g., these elements provide sufficient clearance to allow assembly of the rotor stage. The assembly process may continue by translating the rotor blades 32 and seal members 46 axially forward relative to the disk 34 until the attachment sections 36 of the rotor blades 32 are fully engaged with the disk slots 44. When the rotor stage is fully assembled, the forward axial locator tabs 46A can be seen when the rotor assembly is viewed in a direction from the forward end toward the aft end, and the forward axial locator tabs 46A provide an indication that the seal members 46 are properly positioned. In those embodiments wherein the present disclosure seal members 46 include aft axial locator tabs 46E (e.g., only an aft axial locator tab 46E or both forward and aft axial locators tabs 46A, 46E), the aft axial locator tabs 46E can be seen when the rotor assembly is viewed in a direction from the aft end toward the forward end. Hence, the aft axial locator tabs 46E also provide an indication that the seal members 46 are properly positioned. The configurations of the present disclosure seal members 46 (i.e., having a forward and/or aft axial locator tab 46E), and the configurations of the rotor blades 32 and disks 34 provide the tab slots 70 for receiving the forward or aft axial locator tab 46E, thereby positioning the tabs 46A, 46E for visual inspection, is understood to greatly facilitate rotor stage assembly, and to decrease the chance that a seal member 46 is improperly located within the rotor stage.

In those embodiments wherein the disk 34 includes seal member retaining features 74, each retaining feature 74 mates with a respective seal member 46 to axially locate the seal member 46. The height of the retaining feature 74 prevents the seal member 46 from moving axially forward, and thereby assists in maintaining the aft axial locating tab 46E engaged with the aft tab mating surface 68, and therefore the seal member 46 in the desired axial position.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted is a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A rotor stage for a gas turbine engine, comprising:

a first rotor blade (FRB) having an FRB airfoil, an FRB attachment section, an FRB neck section, and an FRB platform, wherein the FRB neck section extends radially between the FRB attachment section and the FRB airfoil and extends axially between an axially forward end and an axially aft end, wherein the FRB platform extends laterally outward from the FRB neck section, wherein an axial portion of the FRB platform extends axially outward from the axially forward end or the axially aft end, and wherein the FRB platform has an FRB platform inner radial surface, an FRB platform outer radial surface, and an FRB platform lateral edge surface extending between the FRB platform inner radial surface and the FRB platform outer radial surface;

a second rotor blade (SRB) having an SRB airfoil, an SRB attachment section, an SRB neck section, and an SRB platform, wherein the SRB neck section extends between the SRB attachment section and the SRB airfoil, wherein the SRB platform extends laterally outward from the SRB neck section, and wherein the SRB platform has an SRB platform inner radial surface, an SRB platform outer radial surface, and an SRB platform lateral edge surface extending between the SRB platform inner radial surface and the SRB platform outer radial surface;

a disk configured for rotation about a rotational axis, the disk having a forward axial end surface, an aft axial end surface, an outer radial surface that extends between the forward axial end surface and the aft axial end surface, a first disk slot configured to receive the FRB attachment section, and a second disk slot configured to receive the SRB attachment section, wherein the first disk slot and the second disk slot are circumferentially adjacent one another;

wherein the first rotor blade includes at least one first rib extending outwardly from the FRB platform inner radial surface, wherein the at least one first rib includes a first rib end surface; and wherein the rotor stage is configurable in an assembled state and in the assembled state the FRB attachment section is fully received in the first disk slot, and the SRB attachment section is fully received in the second disk slot, and in the assembled state the FRB platform, the SRB platform, and the outer radial surface of the disk form at least one tab slot; and a seal member that includes a central segment and an axial locator tab, wherein in the assembled state, the central segment is engaged with the at least one first rib and the at least one first rib locates the seal member relative to the FRB platform lateral edge surface and the SRB platform lateral edge surface, wherein the axial locator tab is disposed in the at least one tab slot and radially between the axial portion and the outer radial surface of the disk, and wherein the axial locator tab extends axially outward towards the axial portion to a distal end surface, the distal end surface visible in the assembled state between the FRB and the SRB at the axially forward end or between the FRB and SRB at the axially aft end.

2. The rotor stage of claim 1, wherein the at least one first rib includes a plurality of first ribs, and in the assembled state, the plurality of first ribs are disposed to engage with the central segment of the seal member.

3. The rotor stage of claim 2, wherein each rib of the plurality of first ribs includes a first end surface configured for engagement with the seal member.

4. The rotor stage of claim 3, wherein the first end surface of each rib of the plurality of first ribs is spaced apart from the FRB platform lateral edge surface.

5. The rotor stage of claim 3, wherein the first end surface of each rib of the plurality of first ribs converges from a distal peak surface toward the FRB platform lateral edge surface.

6. The rotor stage of claim 1, wherein the at least one first rib comprises a plurality of first ribs, a first of the plurality of first ribs extends outwardly from the FRB platform inner radial surface on a pressure side portion of the FRB platform, and a second of the plurality of first ribs extends outwardly from the FRB platform inner radial surface on a suction side portion of the FRB platform.

7. The rotor stage of claim 1, wherein the second rotor blade includes at least one second rib extending outwardly from the SRB platform inner radial surface, wherein the at least one second rib includes a second rib end surface.

8. The rotor stage of claim 7, wherein the at least one first rib includes a plurality of first ribs, and in the assembled state, the plurality of first ribs are disposed to engage with the central segment of the seal member; and wherein the at least one second rib includes a plurality of second ribs, and in the assembled state, the plurality of second ribs are disposed to engage with the central segment of the seal member.

9. The rotor stage of claim 8, wherein a first of the plurality of first ribs extends outwardly from the FRB platform inner radial surface on a pressure side portion of the FRB platform, and second of the plurality of first ribs extends outwardly from the FRB platform inner radial surface on a suction side portion of the FRB platform; and wherein a first of the plurality of second ribs extends outwardly from the SRB platform inner radial surface on a pressure side portion of the SRB platform, and a second of the plurality of second ribs extends outwardly from the SRB platform inner radial surface on a suction side portion of the SRB platform.

10. The rotor stage of claim 9, wherein the first and the second of the plurality of first ribs each include a first end surface configured for engagement with the seal member, and the first and the second of the plurality of second ribs each include a second end surface configured for engagement with the seal member.

11. The rotor stage of claim 10, wherein the first end surface of the first and the second of the plurality of first ribs is spaced apart from the FRB platform lateral edge surface, and wherein the second end surface of the first and the second of the plurality of second ribs is spaced apart from the SRB platform lateral edge surface.

12. The rotor stage of claim 10, wherein the first end surface of the first and the second of the plurality of first ribs converges from a first distal peak surface toward the FRB platform lateral edge surface, and the second end surface of the first and the second of the plurality of second ribs converges from a second distal peak surface toward the SRB platform lateral edge surface.

13. The rotor stage of claim 1, wherein the at least one tab slot extends axially outward towards the axial portion.

14. The rotor stage of claim 1, wherein in the assembled state the FRB platform, the SRB platform, and the outer radial surface of the disk form a platform channel extending laterally between the FRB inner radial surface and the FRB lateral edge surface or between the SRB inner radial surface and the SRB lateral edge surface, the platform channel extending axially to the axially forward end or the axially aft end, and the platform channel comprising the at least one tab slot.

15. The rotor stage of claim 1, wherein the central segment or the axial locator tab has a uniform cross-sectional geometry.

16. A rotor blade, comprising:

an airfoil;

an attachment section;

a neck section that extends radially between the attachment section and the airfoil and extends axially between an axially forward end and an axially aft end; and a platform that includes:

a suction side platform portion that extends laterally outward from the neck section, wherein the suction side platform portion (SSPP) includes an SSPP inner radial surface, an SSPP outer radial surface, and an SSPP lateral edge surface that extends between the SSPP inner radial surface and the SSPP outer radial surface;

a pressure side platform portion that extends laterally outward from the neck section, wherein the pressure side platform portion (PSPP) includes a PSPP inner radial surface, a PSPP outer radial surface, and a PSPP lateral edge surface that extends between the PSPP inner radial surface and the PSPP outer radial surface;

a platform channel extending laterally between the SSPP inner radial surface and the SSPP lateral edge surface or between the PSPP inner radial surface and the SSPP lateral edge surface, the platform channel extending axially to the axially forward end or the axially aft end, and the platform channel partially forming a tab slot; and at least one first rib extending outwardly from the SSPP inner radial surface and at least one second rib extending outwardly from the PSPP inner radial surface;

wherein the at least one first rib includes a first rib end surface, and the at least one second rib includes a second rib end surface.

17. The rotor blade of claim 16, wherein the first end surface of the at least one first rib is spaced apart from the SSPP lateral edge surface, and the second end surface of the at least one second rib is spaced apart from the PSPP lateral edge surface.

18. The rotor blade of claim 16, wherein the first end surface of the at least one first rib converges from a first distal peak surface toward the SSPP lateral edge surface, and the second end surface of the at least one second rib converges from a second distal peak surface toward the PSPP lateral edge surface.

19. A rotor stage for a gas turbine engine, comprising:

a rotor blade having an airfoil, an attachment section, a neck section, and a platform;

wherein the neck section extends radially between the attachment section and the airfoil and extends axially between an axially forward end and an axially aft end;

wherein the platform includes:

a suction side platform portion that extends laterally outward from the neck section, wherein the suction side platform portion (SSPP) includes an SSPP inner radial surface, an SSPP outer radial surface, and an SSPP lateral edge surface that extends between the SSPP inner radial surface and the SSPP outer radial surface;

a pressure side platform portion that extends laterally outward from the neck section, wherein the pressure side platform portion (PSPP) includes a PSPP inner radial surface, a PSPP outer radial surface, and a PSPP lateral edge surface that extends between the PSPP inner radial surface and the PSPP outer radial surface;

a platform channel extending laterally between the SSPP inner radial surface and the SSPP lateral edge surface or between the PSPP inner radial surface and the SSPP lateral edge surface, the platform channel extending axially to the axially forward end or the axially aft end, and the platform channel partially forming a tab slot; and at least one first rib extending outwardly from the SSPP inner radial surface and at least one second rib extending outwardly from the PSPP inner radial surface;

wherein the at least one first rib includes a first rib end surface, and the at least one second rib includes a second rib end surface;

a disk configured for rotation about a rotational axis, the disk having a forward axial end surface, an aft axial end surface, an outer radial surface that extends between the forward axial end surface and the aft axial end surface, and a disk slot configured to receive the attachment section;

wherein the rotor stage is configurable in an assembled state and in the assembled state the attachment section is fully received in the disk slot; and a seal member that includes a central segment and an axial locator tab, wherein in the assembled state, the central segment is (i) engaged with the at least one first rib and the at least one first rib locates the seal member relative to the SSPP lateral edge surface or (ii) engaged with the at least one second rib and the at least one second rib locates the seal member relative to the PSPP lateral edge surface.

* * * * *